E. L. JONES.
CLAMP FOR LIQUID METERS.
APPLICATION FILED JUNE 1, 1921.
1,437,807.
Patented Dec. 5, 1922.
Fig.1.
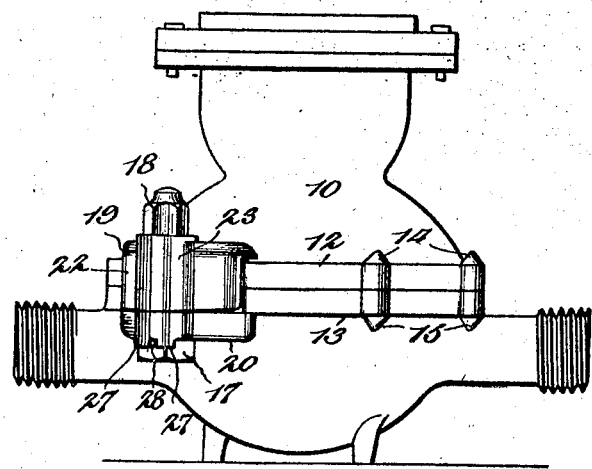
Fig.3.
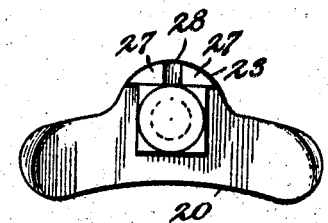
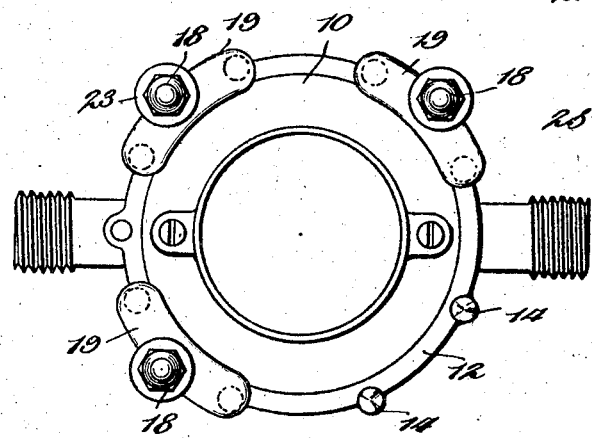
Fig.4.
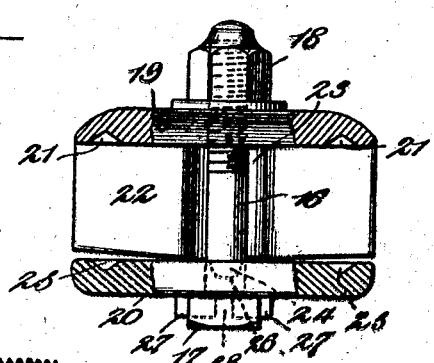
Fig.2.
INVENTOR
Ellis L. Jones.
BY James A. G. Koehl
ATTORNEY Patented Dec. 5, 1922.

1,437,807

UNITED STATES PATENT OFFICE.

ELLIS L. JONES, OF LONG ISLAND CITY, NEW YORK.

CLAMP FOR LIQUID METERS.

Application filed June 1, 1921. Serial No. 474,249.

*To all whom it may concern:*

Be it known that I, ELLIS L. JONES, a citizen of the United States, residing at Long Island City, in the county of Queens and State of New York, have invented certain new and useful Improvements in Clamps for Liquid Meters, of which the following is a specification.

This invention relates to liquid meters, and is particularly directed to the providing of a frost-proof clamp for devices of this nature.

One of the principal objects of the invention is to provide a frost-proof clamp for holding the upper and lower members of liquid meters such as those shown in my co-pending applications, Serial Nos. 383,265 and 403,082.

Another object is to provide a clamp of this nature which shall possess sufficient strength to hold the members of the meter in sealing engagement under the maximum service pressures.

Another object is to provide a clamp of this nature which shall be suitably weakened and assembled so that excessive pressure above maximum service pressure will effect breaking of the clamp, thereby relieving pressure in the meter resulting from freezing of the liquid, thus providing a frost-proof meter.

Another object is to produce a clamp that shall be simple of construction, inexpensive to manufacture, and highly efficient for the purpose for which it is designed.

Another object is to provide clamps for the meter of uniform construction so that the same may be interchangeable thus facilitating manufacture and replacement of broken parts.

Another object is to provide a device of this nature in which no machining of parts is required.

Another object is to effect an equal pressure about the flanges of the meter, exerting pressure at a number of equally spaced points and using only a small number of bolts.

Another object is to produce a device which is simple and facile of manipulation so as to permit easy access to the meter for inspection or other purposes.

Another object is to provide a device such as to permit the use of proper materials for the various parts, thus bronze may be used for the meter body and cast iron for the clamps.

Another object is to produce a clamp in which one of the members is weakened so as to be more easily broken, and to give when subjected to predetermined pressure thus avoiding distortion of the other parts of the meter and clamp.

With these and other objects in view, which will be more apparent as the specification proceeds, the invention resides in certain novel construction and combination and arrangement of parts, the essential features of which are hereinafter fully described, are particularly pointed out in the appended claims, and are illustrated in the accompanying drawing, in which:

Figure 1 is a side elevation of a liquid meter with one clamp showing as attached and another removed.

Figure 2 is a top plan view of the same.

Figure 3 is a bottom view of one of the clamps per se.

Figure 4 is an inner elevational view of one of the clamps per se.

Like characters of reference refer to like parts in all views.

Referring to the drawing in detail, 10 and 11 represent the upper and lower sections respectively, of the meter body, which are respectively provided with flanges 12 and 13 at their mating edges between which a gasket (not shown) is clamped for forming a liquid tight seal. Bosses of the flanges are extended upwardly and downwardly into conical lugs or projections 14 and 15, respectively. These lugs are equally spaced apart around the entire flanges so that when the clamps are applied thereto, an even and substantially uniform pressure is obtained at all points of the flanges.

Each clamp comprises four members, a bolt 16 having a head 17, a nut 18, an upper jaw or clamp member 19, and a lower jaw or clamp member 20. The upper jaw 19 has a horizontal portion provided with two conical seats 21 for receiving two adjacent ones of the conical lugs 14 of the flange 12. This member also includes a depending portion 22 formed at its center to provide a shroud 23 for the bolt 16. The lower surface of shroud 23 is provided with a downwardly extending finger 24.

The lower jaw 20 is provided in its upper face with two conical seats 25 for receiving two adjacent ones of the conical lugs 15 of the flanges 13, and with a seat 17 for the end of finger 24. The lower face of jaw 20 is provided with a pair of fingers 27 which co-act with the head 17 of the bolt 16 to prevent turning when screwing down the nut 18. Between the fingers 27 is a weakening notch 28 which determines the point of breakage of the member 20 when excessive strain is applied. Members 19 and 20 are suitably curved throughout to conform with the contour of the meter body.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. In a device of the class described, the combination of a meter body comprising separable members; lugs formed on said members; a pair of jaws, each co-acting with a plurality of said lugs of a respective one of said members; and means for securing said jaws in operative relation to said lugs.

2. In a device of the class described, the combination of a liquid meter body comprising separable members, mating flanges formed on said members, equally spaced conical lugs formed on said flanges and extending in opposite directions, mating clamp members each provided with conical seats for engaging lugs of respective flanges, and a bolt for drawing said clamp members together to effect a seal of said meter body.

3. In a device of the class described, the combination of a liquid meter body comprising separable members, mating flanges formed on said members, equally spaced conical lugs formed on said flanges and extending in opposite directions, mating clamp members each provided with conical seats for engaging lugs of respective flanges, one of said clamp members being formed with a weakening notch, and a bolt for drawing said clamp members together to effect a seal of said meter body.

4. In a device of the class described, the combination of a liquid meter body comprising separable members, mating flanges formed on said members, equally spaced conical lugs formed on said flanges and extending in opposite directions, mating clamp members each provided with conical seats for engaging lugs of respective flanges, one of said clamp members being provided with a finger and the other with a co-acting socket, and a bolt for drawing said clamp members together to effect a seal of said meter body.

5. In a device of the class described, the combination of a liquid meter body comprising separable members, mating flanges formed on said members, equally spaced conical lugs formed on said flanges and extending in opposite directions, mating clamp members each provided with conical seats for engaging lugs of respective flanges, and a bolt for drawing said clamp members together to effect a seal of said meter body, one of said clamp members being provided with a shroud for said bolt.

6. In a device of the class described, the combination of a liquid meter body comprising separable members, mating flanges formed on said members, equally spaced conical lugs formed on said flanges and extending in opposite directions, mating clamp members each provided with conical seats for engaging lugs of respective flanges, and a bolt for drawing said clamp members together to effect a seal of said meter body, one of said clamp members being provided with a pair of fingers for holding said bolt against turning, said fingers defining a weakening notch.

7. A clamp comprising a bolt and a pair of jaw members, each of said jaw members being provided with a plurality of conical seats, one of said jaw members being formed with a shroud for said bolt, said jaw members being provided with co-acting interfitting elements, and one of said jaw members being provided with means for preventing turning of said bolt, said means defining a weakening notch as and for the purpose set forth.

Signed at New York, in the county of New York and State of New York, this 21st day of February, 1921.

ELLIS L. JONES.